United States Patent
Nguyen et al.

(10) Patent No.: US 7,736,788 B2
(45) Date of Patent: Jun. 15, 2010

(54) PATTERN MOLDING OF POLYMERIC FLOW CHANNELS FOR MICRO FUEL CELLS

(75) Inventors: Nam Trung Nguyen, Singapore (SG); Siew Hwa Chan, Singapore (SG)

(73) Assignee: Nanyang Technological University, Singapore (SG)

(*) Notice: Subject to any disclaimer, the term of this patent is extended or adjusted under 35 U.S.C. 154(b) by 1342 days.

(21) Appl. No.: 11/202,062

(22) Filed: Aug. 12, 2005

(65) Prior Publication Data

US 2007/0037037 A1 Feb. 15, 2007

(51) Int. Cl.
*H01M 8/02* (2006.01)

(52) U.S. Cl. .................. 429/38; 427/58; 205/183

(58) Field of Classification Search .......... 429/34, 429/38; 427/58; 205/183
See application file for complete search history.

(56) References Cited

U.S. PATENT DOCUMENTS

| | | | |
|---|---|---|---|
| 5,073,237 A | 12/1991 | Bacher et al. | |
| 5,378,583 A | 1/1995 | Guckel et al. | |
| 5,676,983 A | 10/1997 | Bacher et al. | |
| 5,753,385 A | 5/1998 | Jankowski et al. | |
| 5,795,519 A | 8/1998 | Bacher et al. | |
| 6,194,900 B1 * | 2/2001 | Freeman et al. | 324/321 |
| 2002/0171026 A1 * | 11/2002 | Kuroda | 249/114.1 |
| 2003/0138685 A1 | 7/2003 | Jankowski et al. | |
| 2004/0043273 A1 | 3/2004 | Jankowksi et al. | |
| 2004/0048128 A1 | 3/2004 | Jankowksi et al. | |
| 2004/0072039 A1 | 4/2004 | Jankowski et al. | |

OTHER PUBLICATIONS

Siew Hwa Chan et al., Journal of Micromechanics and Microengineering, vol. 15 (2005), pp. 231-236.

* cited by examiner

*Primary Examiner*—Jane Rhee
(74) *Attorney, Agent, or Firm*—Birch, Stewart, Kolasch & Birch, LLP

(57) ABSTRACT

The invention relates to a method for large scale manufacturing of polymeric micro fuel cells using a metallic mold. The method includes creating a Gaussian-shaped channel on a first substrate using a laser; sputtering a metallic seed layer over the first substrate using a first metal; electroplating a second metal over the seed layer to create a negative mold; releasing the negative mold from the first substrate; fabricating a plurality of second substrates, each having a Gaussian-shaped channel, and using the negative mold to fabricate multiple fuel cells. The method provides lower cost and greater flexibility as compared with conventional ablation and etching processes of manufacturing of polymeric micro fuel cells.

24 Claims, 13 Drawing Sheets

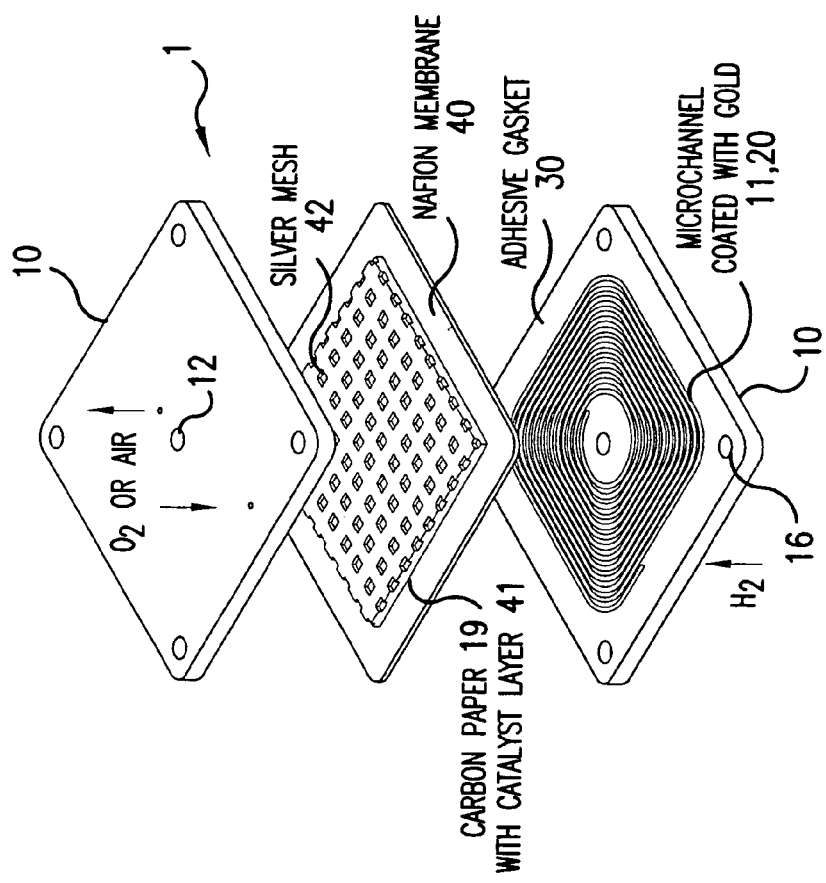
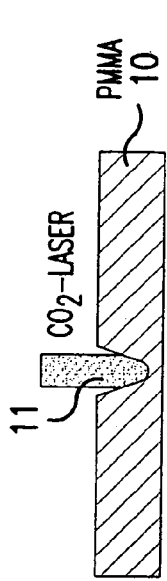
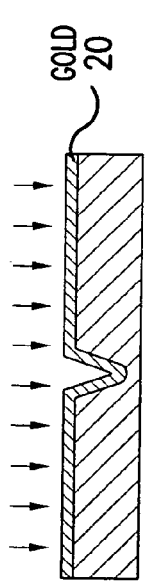
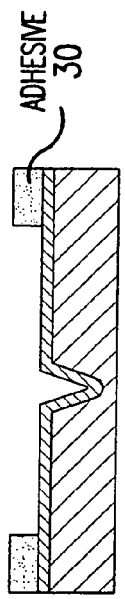
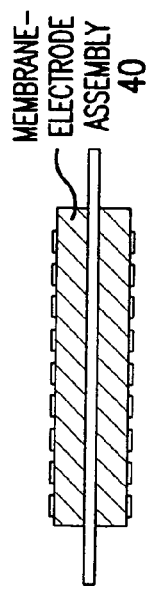
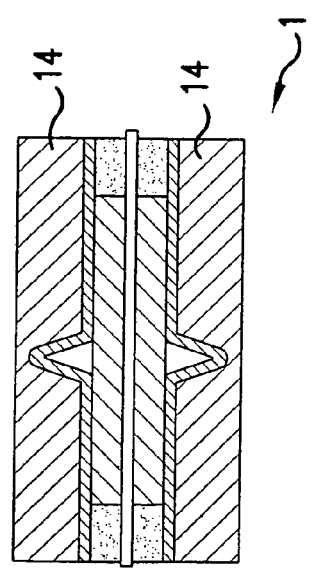

POISSEUILLE NUMBER OF DIFFERENT CROSS SECTION TYPES AS FUNCTION OF ASPECT RATIO *H/W*

16% LASER POWER

14% LASER POWER

12% LASER POWER

10% LASER POWER

8% LASER POWER

6% LASER POWER

4% LASER POWER

2% LASER POWER

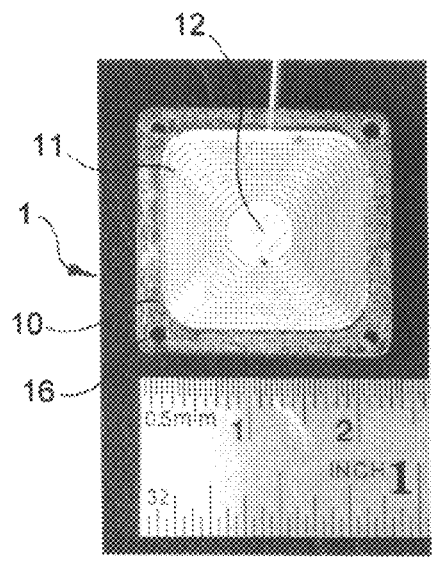
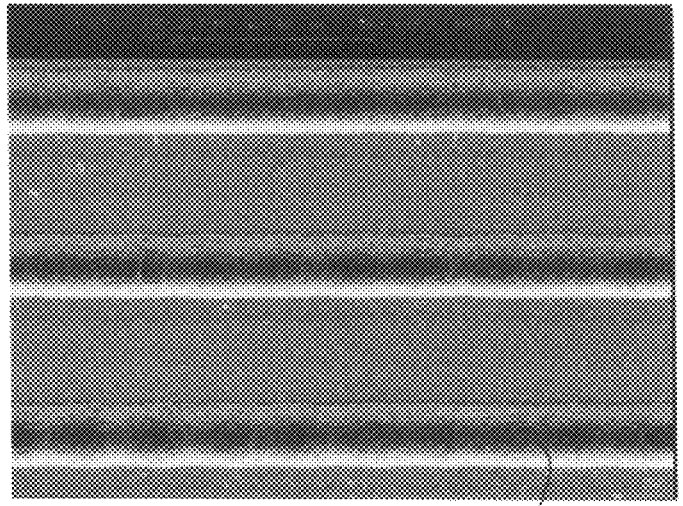
FIG.4a  FIG.4b
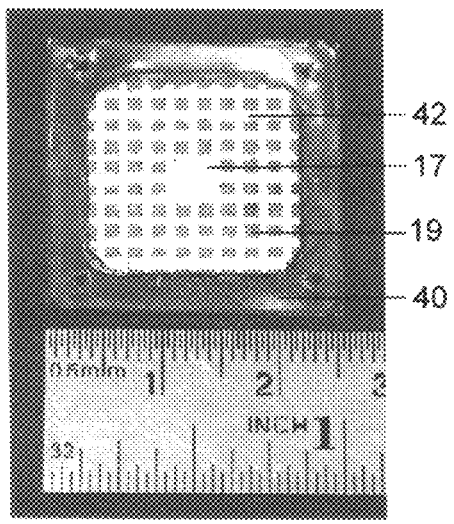
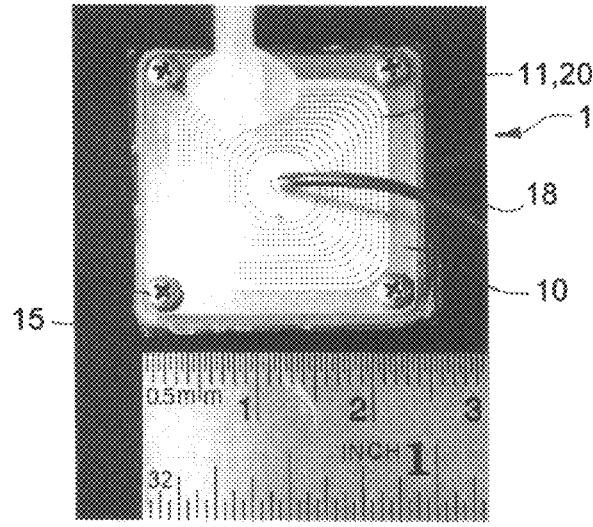
FIG.5a  FIG.5b

PATTERN MOLDING OF POLYMERIC FLOW CHANNELS FOR MICRO FUEL CELLS

BACKGROUND OF THE INVENTION

1. Field of the Invention

The invention relates to a technology for mass production of polymeric micro fuel cells. Specifically, the invention relates to the production and replication of polymeric parts used as substrates and electrodes for micro fuel cells, and it relates to the production of a metal mold of the polymeric parts with smoothly curved channel walls, which otherwise would need to be formed with time-consuming laser ablation or etching processes. The invention further encompasses fuel cells and parts thereof made by the methods of the invention.

2. Description of Background Art

Fuel cells have gained renewed interest for applications in high power consumption electronic devices such as data acquisition and communication devices. Since the energy is stored as a 'reservoir' of fuel rather than as an integral part of the power source, fuel cells have advantages over batteries. A miniaturized fuel cell power source can be realized through an approach that combines thin film materials with MEMS (micro-electro-mechanical system) technology. Conventional techniques for producing micro-scale polymeric parts, including Replication Technologies and Micromachining Methods, are described below.

Replication Technologies.

The production of micro-scale polymeric parts via LIGA (German acronym for lithography, electroplating and molding) is a multi-step process requiring mask production, synchrotron exposure of a polymethylmethacrylate (PMMA) substrate (typically PMMA bonded to a metallized silicon wafer or a solid metal plate), development of the PMMA, electroplating to fill the cavities left within the PMMA mold, lapping and final dissolution of the remaining PMMA. Such technology is described in U.S. Pat. No. 5,378,583. A constraining step in this process is the requirement for access to one of the very limited number of synchrotron facilities. Furthermore, the synchrotron exposure only allows the fabrication of channels with straight channel walls and with sharp top corners, which makes subsequent coating of the channel surface with an electrically conducting layer having low resistance impossible.

Thus, a key challenge in LIGA is the replication of metallic molds with smoothly curved relief structures. Many applications require a polymeric substrate with a thin conducting surface, which is coated by line-of-sight methods, such as sputtering or evaporation. The straight deposition pathway precludes coating of a channel wall made by LIGA, or made by other micromachining techniques such as DRIE (deep reactive ion etching).

U.S. Pat. No. 5,073,237, titled "Method Of Making Molds For Electrodeposition Forming Of Microstructured Bodies", discloses a two-layer substrate that consists of a sputtered or vapor deposited film of metal or carbon on an insulating polymer base such as PMMA. The substrate is used in the standard embossing process, during which the metal film along the walls of the embossed features is stretched and disrupted to form a discontinuous and therefore non-conductive array of isolated spangles of the deposited film. The film in the bottom of the embossed features is not disrupted in this manner, and provides a conductive contact for subsequent electroplating of the features.

Electroplating of micro-features with high aspect ratios with conductive walls and bases tends to close off the channel (feature cavity) before it has been completely plated up from the bottom. The special curved structure in the present invention can prevent such a problem.

U.S. Pat. No. 5,676,983, titled "Tool For Making A Microstructured Plastic Mold From Which Structures Can Be Formed Galvanically", and U.S. Pat. No. 5,795,519, titled "Process Of Making A Microstructured Plastic Mold", again utilize a two-layer substrate. These devices provide an embossing master tool in which the features have smooth walls, but the top surfaces of the features possess rough surfaces having points and ridges adapted to penetrate into the electrically insulating layer. This enhanced penetration allows the embossing tool to more efficiently expose the electrically insulating layer at the bottom of the embossed cavities.

None of the above processes provide a simple and versatile method of replicating plastic parts with smoothly walled features. Many require the pre-fabrication of specific plastic substrates, which contain a conducting layer adhered to a non-conducting layer with precise height requirements. Thus, there remains a need in the micro-fabrication art for a general method capable of replicating polymeric structures and parts needed for micro fuel cell applications.

Micromachined Micro Fuel Cells.

U.S. Pat. No. 5,753,385, U.S. Pat. Appl. No. 20030138685, titled "MEMS-based thin film fuel cell", U.S. Pat. Appl. No. 20040043273 "Solid oxide MEMS-based fuel cells", U.S. Pat. Appl. No. 20040048128 "Solid polymer MEMS-based fuel cells", and U.S. Pat. Appl. No. 20040072039 "MEMS-based fuel cells with integrated catalytic fuel processor and method thereof" claim MEMS-based fuel cells of a solid oxide type (SOFC), solid polymer type (SPFC), or proton exchange membrane type (PEMFC).

In one example in U.S. Pat. No. 5,753,385, the thin film solid oxide fuel cell (TFSOFC) stack was formed using physical vapor deposition (PVD) techniques. The host substrate used was a silicon wafer covered by a thin layer of silicon nitride. A layer of nickel was first deposited, followed by a layer yttria-stabilized zirconia (YSZ). The conditions during the deposition were adjusted in order to achieve smooth, dense, continuous films, thus avoiding pinhole formation which could result in electrical shorting through the electrolyte layer.

The present invention was conceived and developed to address the problems with these conventional techniques.

BRIEF DESCRIPTION OF THE DRAWINGS

The present invention will become more fully understood from the detailed description given hereinbelow and the accompanying drawings which are given by way of illustration only, and thus are not limitative of the present invention.

FIGS. 1(a) to 1(f) illustrate a process of the present invention for fabricating an individual polymeric micro fuel cell by creating a Gaussian shaped microchannel by laser engraving of a PMMA substrate, wherein:

FIG. 1(a) illustrates the flow channels in the substrate which are ablated with a $CO_2$ laser;

FIG. 1(b) illustrates a gold layer sputtered over the substrate surface;

FIG. 1(c) illustrates applying an adhesive gasket for bonding;

FIG. 1(d) illustrates the membrane electrode assembly;

FIG. 1(e) shows the assembled micro fuel cell; and

FIG. 1(f) illustrates an exploded view of the micro fuel cell.

FIGS. 4(a) and 4(b) illustrate the fabrication process for the polymeric micro fuel cell, with FIG. 4 (a) depicting the fabricated base substrate with the spiral microchannel, and FIG. 4(b) depicting a close-up image of the channel.

FIGS. 5(a) and 5(b) show the fabricated fuel cell, with FIG. 5(a) showing the membrane electrode assembly, and FIG. 5(b) showing the assembled micro fuel assembly.

FIGS. 10(a) to 10(f) describe the method of the present invention for fabricating polymeric micro fuel cells on a large scale, wherein:

FIG. 10(a) illustrates the flow channels in a positive electrode that are ablated with a $CO_2$ laser;

FIG. 10(b) illustrates a metallic seed layer sputtered over the substrate surface;

FIG. 10(c) illustrates electroplating with another metal that fills the channel and builds up the base of the metallic negative mold;

FIG. 10(d) illustrates the metallic negative mold that is released by dissolving the polymeric part;

FIG. 10(e) shows the metallic negative mold used in injection molding or hot-embossing processes to fabricate a large number of plastic parts; and FIG. 10(f) illustrates one side of a plastic part that is coated with a metal layer, ready for use in the micro fuel cell.

DETAILED DESCRIPTION OF THE PREFERRED EMBODIMENTS

Figure 2A:
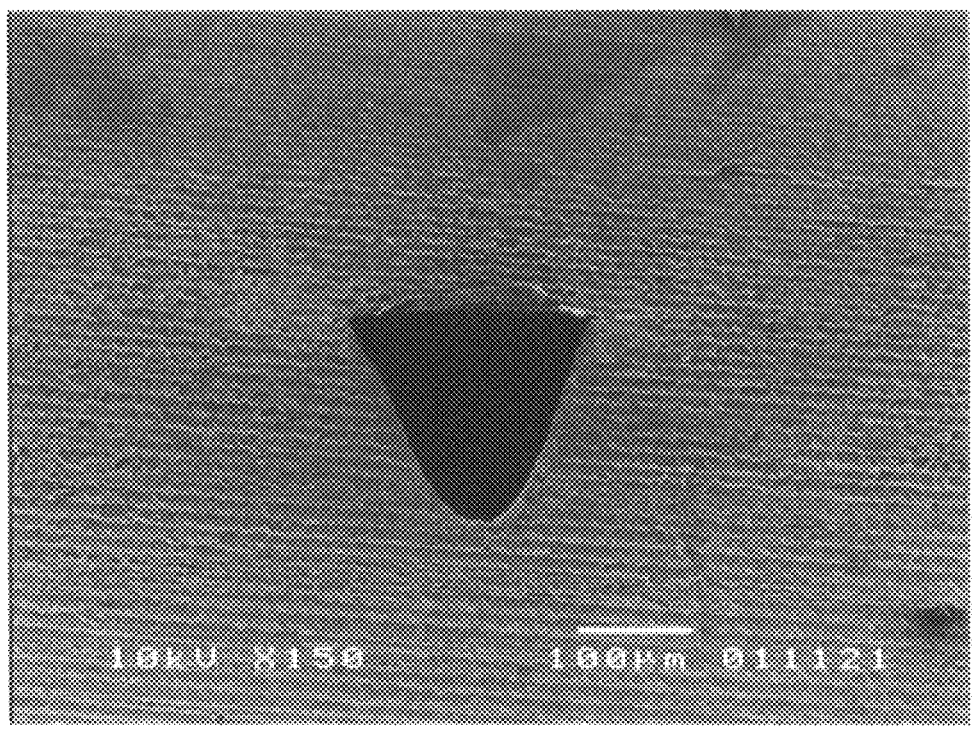
FIG. 2(a) illustrates the Gaussian-shaped microchannel (4% beam and 6% laser power)

According to a first aspect of the present invention, a method is provided for fabricating a polymeric micro fuel cell with a higher power density than prior devices. The performance is due to the novel design of the fuel delivering microchannels as well as the channel shape. The micro channel is micromachined with a $CO_2$ laser and has a Gaussian shape. This channel shape cannot be achieved with other polymeric micromachining techniques such as molding or excimer laser machining. The curved channel wall allows sputtering of a smooth current collector layer, which greatly decreases the internal electrical resistance of the fuel cell.

According to a second aspect of the present invention, a method is provided for large scale manufacturing of polymeric micro fuel cells using a metallic mold, which can reduce the manufacturing cost and time, increase the flexibility for changing chip design, and satisfy the current and future technical requirements for manufacturing of polymeric fuel cells. The second aspect of the present invention includes fabricating a negative mold having a Gaussian-shaped topography that can be used for large scale fabrication of polymeric parts with smoothly curved channel walls.

According to the first aspect of the present invention, a method is provided for fabricating a polymeric micro fuel cell having a Gaussian shaped microchannel. The method includes engraving of a substrate, preferably PMMA, with a laser. PMMA is known under trade names such as Acrylic, Oroglass, Perspex, Plexiglas or Lucite. This material is commercially available in the form of extrusion sheets. PMMA is one of the thermoplastic polymers, which are usually linear-linked and can be softened by applying heat at or above the glass transition temperature. The polymer can be reheated and reshaped before hardening in its form many times. PMMA has a non-crystalline structure with an optical property in the range of 85% to 95% light transmittance in the visible spectrum. The thermal property of PMMA does not allow the heat generated by a laser to dissipate quickly, thus allowing transferring of the energy distribution of a laser beam into a corresponding geometry in the material. Surface properties of PMMA can be chemically modified to suit a particular application. In addition, this material also offers other excellent properties such as low frictional coefficient, high chemical resistance and good electrical insulation. The above features and properties make PMMA a good substrate for microfluidic devices, especially for those involved in chemical applications. A PMMA substrate can be micro machined in many ways, such as x-ray exposure and subsequent developing, hot embossing and laser machining.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Any particular embodiment of the invention may not demonstrate every advantage of the invention described herein.

FIG. 1(a) to FIG. 1(f) illustrate the fabrication process of the present invention for making the polymeric micro fuel cell 1.

In FIG. 1(a) the microchannels 11 for fuel flow and oxidant flow is first carved into a substrate 10 by ablation with a $CO_2$ laser. The microchannel shown in FIG. 1(a) is fabricated by the Universal M-300 Laser Platform (Universal Laser Systems Inc.). The system uses a 25 W $CO_2$ laser with a characteristic wavelength of 10.6 μm. The maximum beam speed is about 640 m min$^{-1}$. The microchannel 11 formed in the ablation process of the $CO_2$ laser is determined principally by thermal energy. Therefore the cross section of the microchannels 11 depend on the energy distribution of the laser beam, its moving speed and the number of passes, the laser power and the thermal diffusivity of the material of the substrate 10. The energy of the laser beams when viewed in cross-section has a Gaussian distribution, thus the cross section of a curved channel also has a Gaussian shape.

Referring to FIGS. 2(a) through 2(k), features of Gaussian shaped channels that are important to the present invention will be described below, including the features of a low pressure loss, curved wall channels, and an adjustable aspect ratio.

The typical cross sections of a Gaussian-shaped microchannel can be seen in FIG. 2(a).

The Gaussian shape function is derived from the laser power distribution function. The penetration depth y follows the power density of the cross-section of the laser beam.

A Gaussian curve is described by the function:

$$y = H \exp\left[\frac{-x^2}{(W/4)^2}\right]$$

where H=penetration depth of the channel, W=width of the channel, x is the position along the width of the channel, and y, as defined above, is the penetration depth at point x.

Figure 2B:
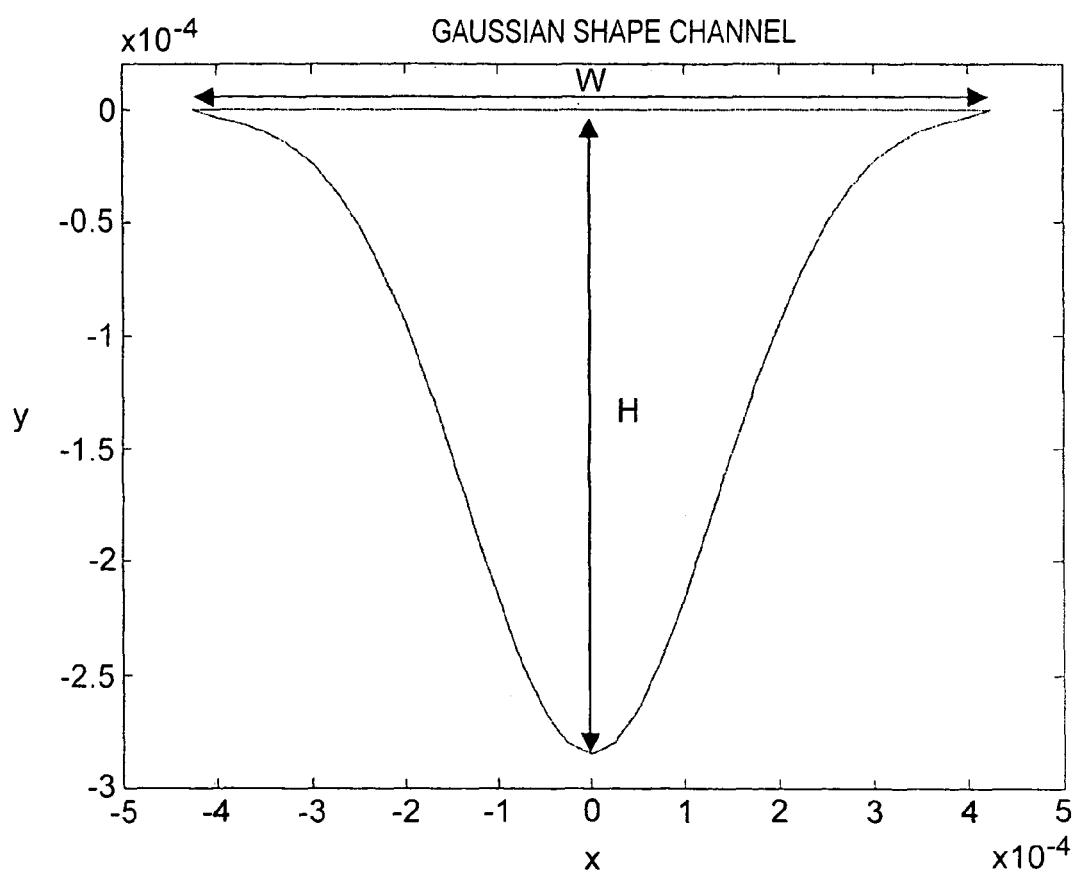
FIG. 2(b) illustrates a cross section of a representative Gaussian shaped channel (H=285 μm, W=760 μm)

FIG. 2(b) illustrates a cross section of a representative Gaussian shaped channel (H=285 μm, W=760 μm).

Low Pressure Loss.

A Gaussian shaped channel is similar to, but not identical to, a sinusoidal channel, whose geometry is defined as: y=H [1+cos(πz/W)]

The hydraulic characteristics of a certain channel shape is represented by the Poiseuille number Po:

$$Po = -\frac{1}{\mu}\frac{dp}{dx}\frac{D_h^2}{2U_m}$$

where μ is the viscosity of the liquid, dp/dx is the pressure gradient, $D_h$ is the hydraulic diameter, and $U_m$ is the average velocity in the channel.

Figure 2C:
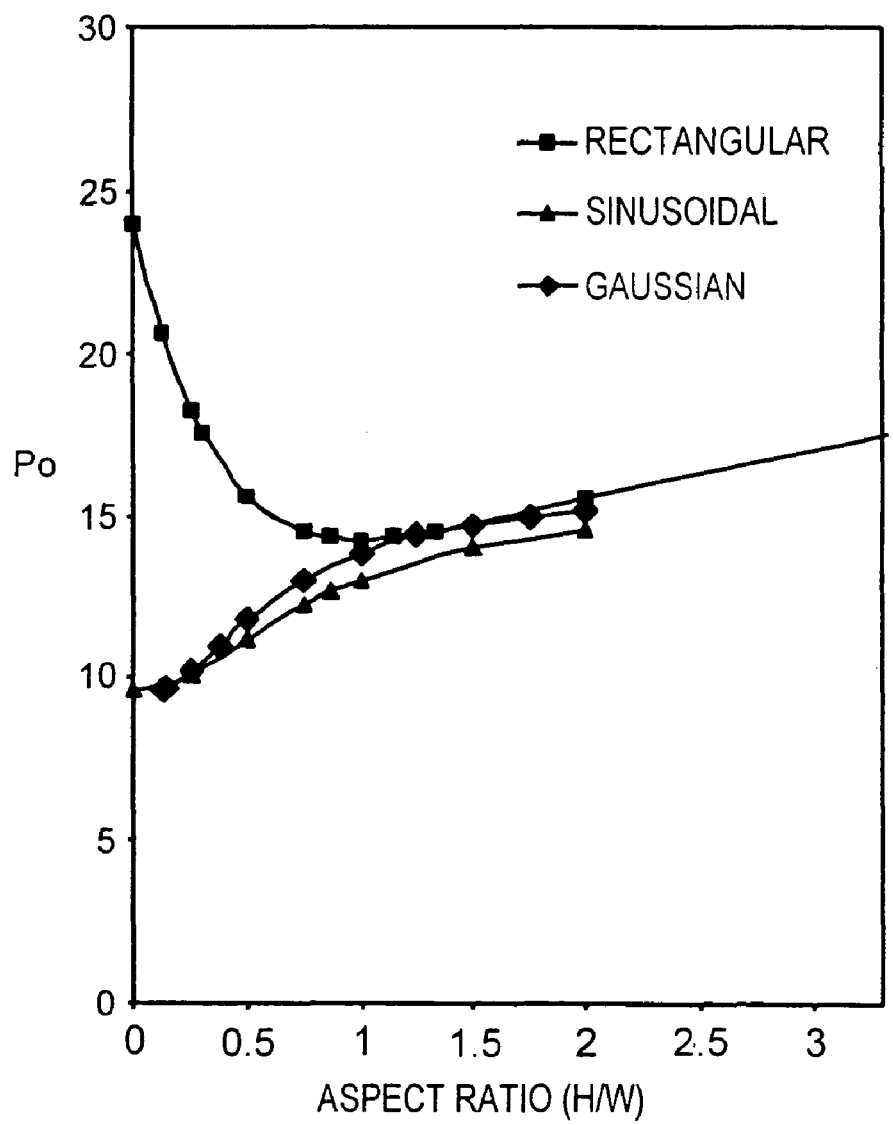
FIG. 2(c) illustrates the Poisseuille number of channels with different types cross sections as function of aspect ratio H/W.
Figure 2D:
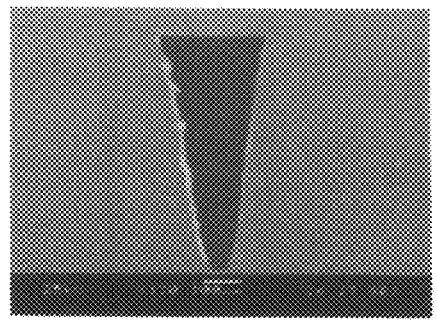
FIGS. 2(d) through 2(k) illustrate cross section shape as function of laser power (percentage of the maximum power of 25 W) at a constant scanning speed.
Figure 2E:
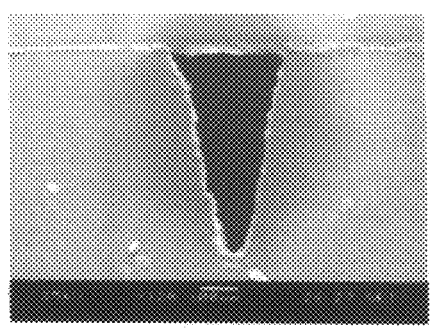
Figure 2F:
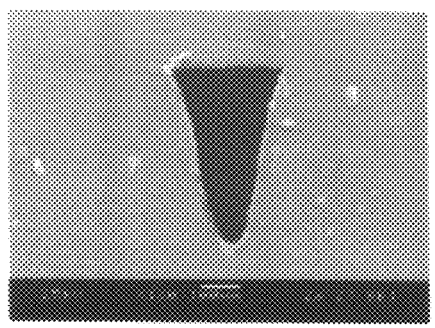
Figure 2G:
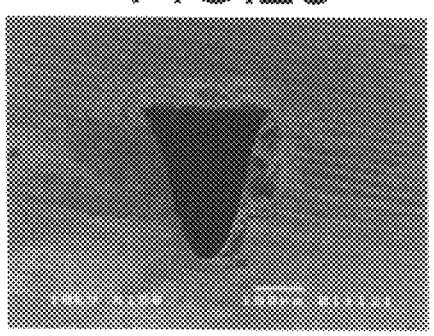
Figure 2H:
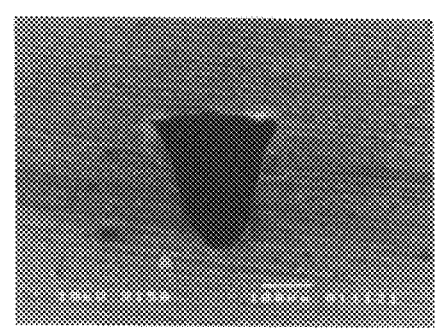
Figure 2I:
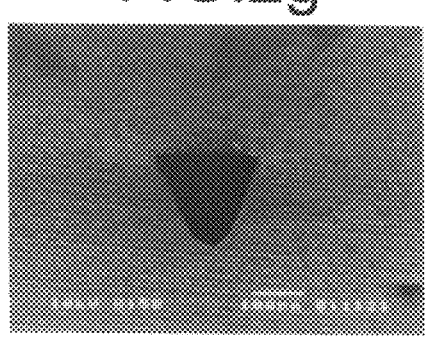
Figure 2J:
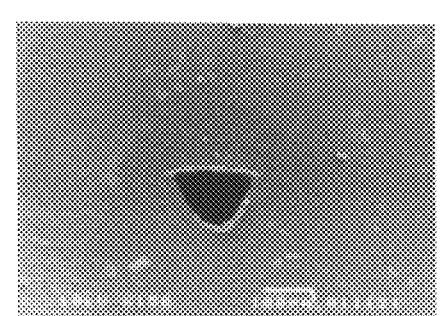
Figure 2K:
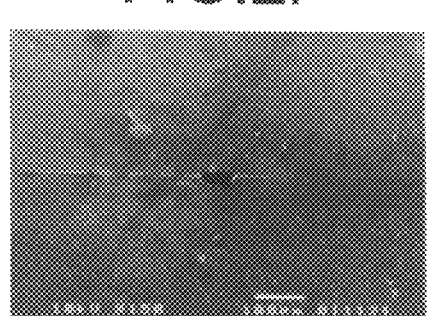

The Poiseuille number is independent of the channel size and is only a function of the channel shape. A cylindrical channel has a constant Poiseuille number of Po=16. The smaller the Poiseuille number, the less is the pressure drop across the channel. FIG. 2(c) illustrates the Poisseuille number of channels with different types cross sections as function of aspect ratio H/W.

As can be seen in FIG. 2(c), compared to a rectangular channel of the same aspect ratio, a Gaussian channel results in a substantially lower Poiseuille number. Despite the advantage of low pressure drop, a Gaussian shaped channel is difficult and expensive to fabricate with conventional technology.

Curved Channel Wall.

The curved channel wall is another unique property of a Gaussian channel. All metal deposition methods such as sputtering and evaporation are line-of-sight methods. In line-of-sight deposition methods, the side wall of a rectangular channel can not be covered by sputtering or evaporation. Unlike channels fabricated by conventional techniques, a Gaussian channel allows for uniform coating of the channel wall with a metal layer, which is very important for the fabrication of micro fuel cells.

Adjustable Aspect Ratio.

The aspect ratio (H/W) of a Gaussian channel can be adjusted by the power intensity of the laser. While the channel width W is fixed by the laser beam size, the channel height is controlled by the laser power. Another control parameter is the scanning speed of the laser beam. This feature of Gaussian channels may be seen in FIG. 2(d) through FIG. 2(k), which illustrate cross sectional shapes as a function of laser power (percentage of the maximum power of 25 W) at a constant scanning speed. Gaussian channels may be effectively produced with other beam speeds and laser powers, for example with beam speeds in the range 6.4 to 64 mm/s, and laser power in a range of 0.25 W to 25 W.

Additional advantages of Gaussian-shaped microchannels will become apparent in the subsequent fabrication step.

Example of Fabrication of a Micro Fuel Cell

As shown in FIG. 1(b), a gold layer 20 of about 40-nm thickness, was sputtered over the surface of the substrate 10 (SC7640 sputter coater, Quorum Technologies Ltd.). The thickness of the gold layer 20 is not limited to 40-nm, and may be also 50-nm to 100-nm, or up to 200-nm if desired. This gold layer 20 acts as the current collector and corrosion protection layer for the fuel cell 1. Since sputtering only allows straight deposition, the Gaussian shape allows gold to cover all sides of the channels 11. This feature is important for the application of a current collector. The flow channel 11 is designed to have a spiral shape in this example.

The design of the base substrate needs to consider two basic aspects. The first aspect is the design of microchannels for fuel delivery with water management. The second aspect is the current-collecting method. The electrical resistance should be minimized by a large electrically conducting surface, while a large channel area improves the diffusion of reactants. An optimization regarding both aspects must be considered for the design.

Water management is an important issue in the design of the microchannel of the fuel cell. On the one hand, water is the reaction product and should be transported away. On the other hand, supplied dry hydrogen should be humidified in the fuel cell for better performance. The embodiment of the micro fuel cell 1 of the present invention was designed in a way that eliminates the need for an external humidifying system for fuel and oxidant. The stand-alone micro fuel cell 1 can use dry hydrogen on the anode side and ambient air or dry oxygen on the cathode side. In the embodiment of the micro fuel cell 1, water generated by the reaction is utilized for humidification.

Figure 3:
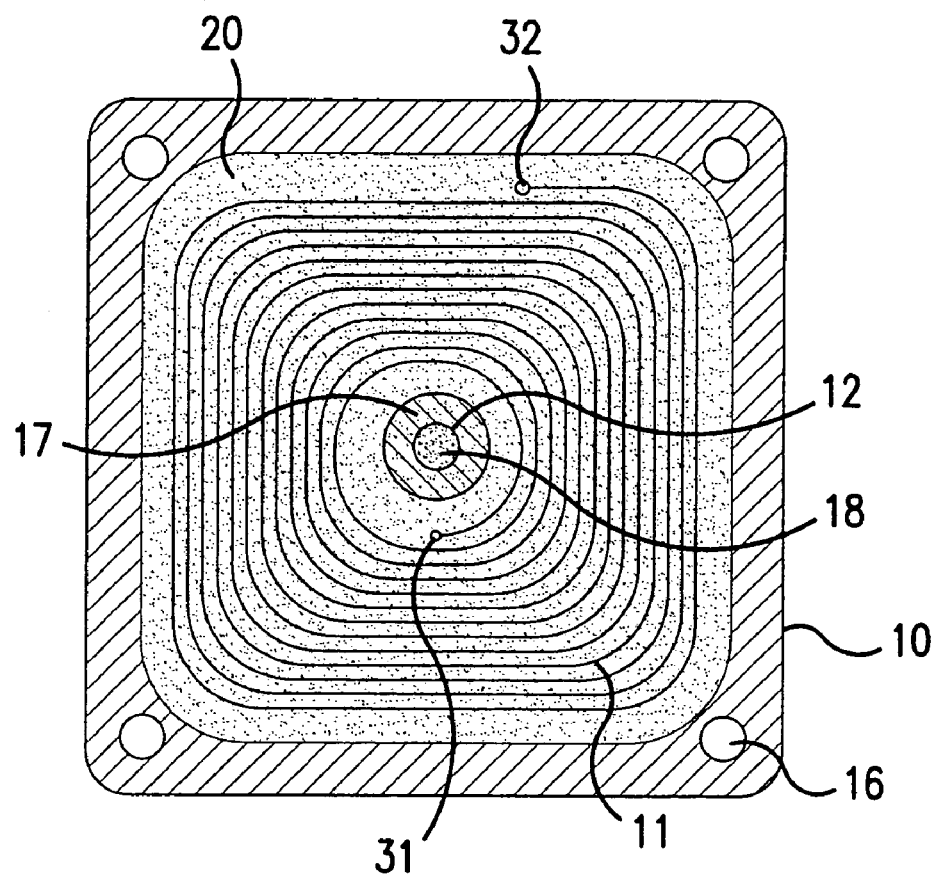
FIG. 3 illustrates the base substrate of the polymeric micro fuel cell.

As can be seen in FIG. 3, the flow channel 11 of the micro fuel cell is designed to have a spiral shape. Such a design enables the relatively dry gas in the outer spiral line entering at gas inlet 32 to become hydrated by acquiring some of the moisture from the adjacent inner spiral line, and to exit at gas outlet 31. The ablation process of the microchannels 11 in this example uses a beam speed of 4% of the maximum beam speed of 640 mm/s, and a laser power of 6% of the maximum laser power of 25 W. A channel width and channel depth of 220 μm can be expected from these parameters. With different parameters, channel widths and depths of 100 to 500 μm, or up to 1400 μm are also possible. Channels smaller than 100 μm may cause high pressure drop and thus require the use of a more powerful delivering pump. The spiral design also enables the electrical contact 17 to be placed in the middle of the cell 1, which minimizes the resistance of the current collector. In the middle of the base substrate, a small hole 12 is drilled using the same laser, and an electrical wire 18 was inserted through the hole 12 and bonded by a silver-loaded adhesive 30.

FIG. 4 (a) depicts the fabricated base substrate 10 with the spiral microchannel 11. The close-up image of the channel 11 is shown in FIG. 4(b). In order to press the base substrate 10 tightly with the membrane electrode assembly 40, four holes 16 were also drilled in the corner of the base substrate to mount bolts 15 for adjusting pressing force.

In the middle of the base substrate 10, a small hole 12 was drilled using the same laser, and an electrical wire 18 was inserted through the hole 12 and bonded by a silver-loaded adhesive 30, as shown in FIG. 1(c), to form an electrode 14.

The heart of the fuel cell 1 is the membrane electrode assembly (MEA) 40, as shown in FIG. 1(d). A Nafion 1135 membrane (DuPont) was used in this example. The membrane 40 was first treated with 5% hydrogen peroxide solution heated to the boiling point to oxidize organic impurities, then rinsed in deionized water, and then immersed in 0.5M hot sulfuric acid to get rid of any metallic residue. After being washed in boiling deionized water several times, the membrane 40 was ready for use. In the fabrication process of the electrodes, Toray carbon paper 19 (for example, TGPH-090 with a typical thickness of 260 μm, and typical density of 0.49 g/cm$^3$) is treated by hydrophobic PTFE (polytetrafluoroethylene). After applying a diffusion layer (carbon powder mixed with PTFE) on one side, a catalyst layer 41 was coated upon the diffusion layer. The catalyst layer 41 is made of Nafion (Nafion solution 5112, from DuPont) bonded platinum on carbon (40% Pt/C, from E-TEK Div. of De Nora N.A., Inc.), which extends the three-phase boundary for electrochemical reaction. In other words, platinum was used as a catalyst here, the platinum being "glued" on a carbon matrix by a technique using Nafion. The catalyst layer 41 contains 1 mg/cm$^2$ platinum and 1 mg/cm$^2$ Nafion. To increase the conductivity of the carbon paper 19, silver conductive paint 42 was printed on the one or both sides of the carbon paper 19, which is used as a part of the current collector. The silver electrical conductor 42 is designed to have a mesh shape. The printed part is mainly used as a current collector, and the non-printed part is mainly used as the gas diffusion area. In the middle of the electrode is the electrical pad, which later should be in direct contact with the base substrate 10. Of course, other electrode configurations may be used.

As shown in FIG. 1(e), the membrane 40 was sandwiched by two electrodes 14 and pressed at 60 kg/cm$^2$ and 130° C. for 3 minutes, thus forming the exemplary polymeric micro fuel cell 1. With dimensions of approximately 1.8 cm×1.8 cm, the electrode area of the polymeric micro fuel cell 1 is about 3 cm$^2$, as can be seen in FIGS. 5(a) and (b).

In the final step, the two PMMA substrates 14 and the MEA were bonded together using an adhesive gasket. The gasket (Adhesives Research, Inc., Arclad 8102 transfer adhesive, for example) was also machined with the same laser system described above. The micro fuel cell 1 was assembled by four screw bolts 15 or other fasteners passing through holes 16.

FIG. 1(f) is an exploded view of the completed polymeric micro fuel cell 1.

Example of Operation of the Polymeric Micro Fuel Cell

The micro fuel cell constructed as above was tested operationally.

Figure 6:
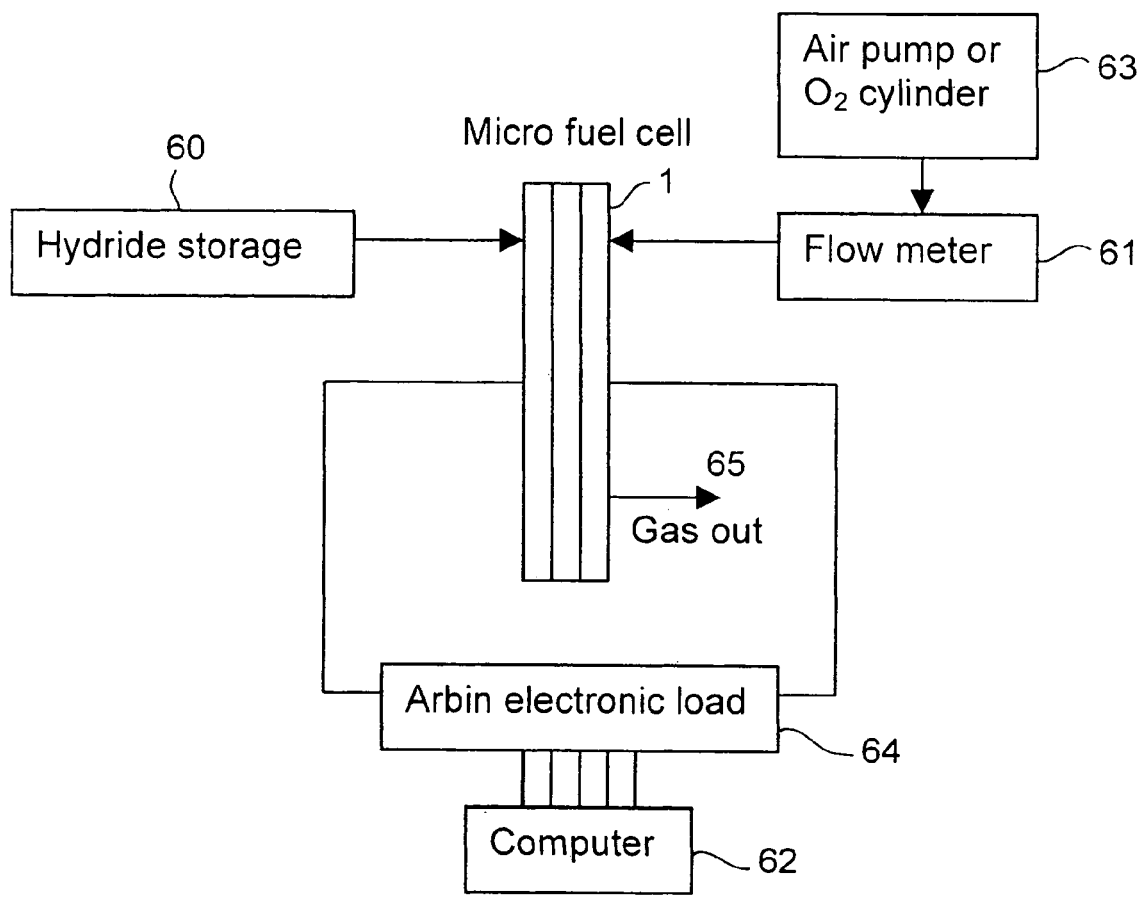
FIG. 6 is a is a schematic of the facility used for testing the polymeric micro fuel cell of the present invention.

FIG. 6 is a schematic of the facility used for testing the polymeric micro fuel cell 1 of the present invention. Hydrogen was supplied by a hydride storage 60. Air or oxygen flow rate was controlled by a flow meter 61. The Arbin electronic load 64 was controlled by a computer 62. The operation conditions are as follows.

All tests were at room temperature of 24° C.

Hydrogen was set to be dead-ended during testing (the hydrogen outlet hole 65 was open before testing, after the hydrogen replaces the air, the outlet hole 65 was closed) and the pressure of hydrogen was 10 psi.

The air was supplied by an air pump 63, the flow rate is kept constant at 50 ml min$^{-1}$.

The oxygen flow was controlled and kept constant at 20 ml min$^{-1}$.

Figure 7:
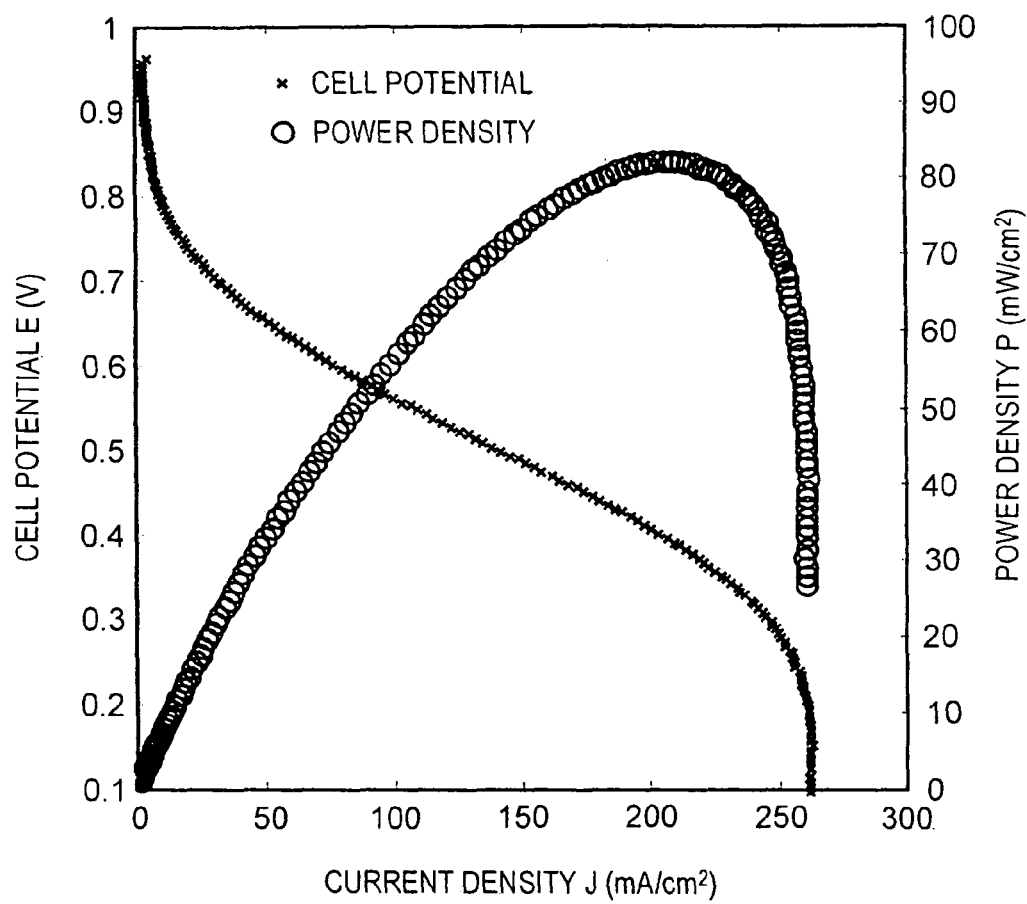
FIG. 7 shows the performance of the micro fuel cell using a hydrogen/air reaction.

FIG. 7 shows the performance of the micro fuel cell for the hydrogen/air reaction. The power density reaches a peak at a current density of 205 mA cm$^{-2}$. The voltage and power density corresponding to this point are 0.40 V and 82 mW cm$^{-2}$, respectively. Normally, fuel cells are designed to operate at a point slightly to the left of this point (i.e., at slightly lower current density) for a good compromise between cell efficiency, low capital cost and stable operation. For instance, if the operation voltage is set to be 0.50 V the power density is about 70 mW cm$^{-2}$.

Figure 8:
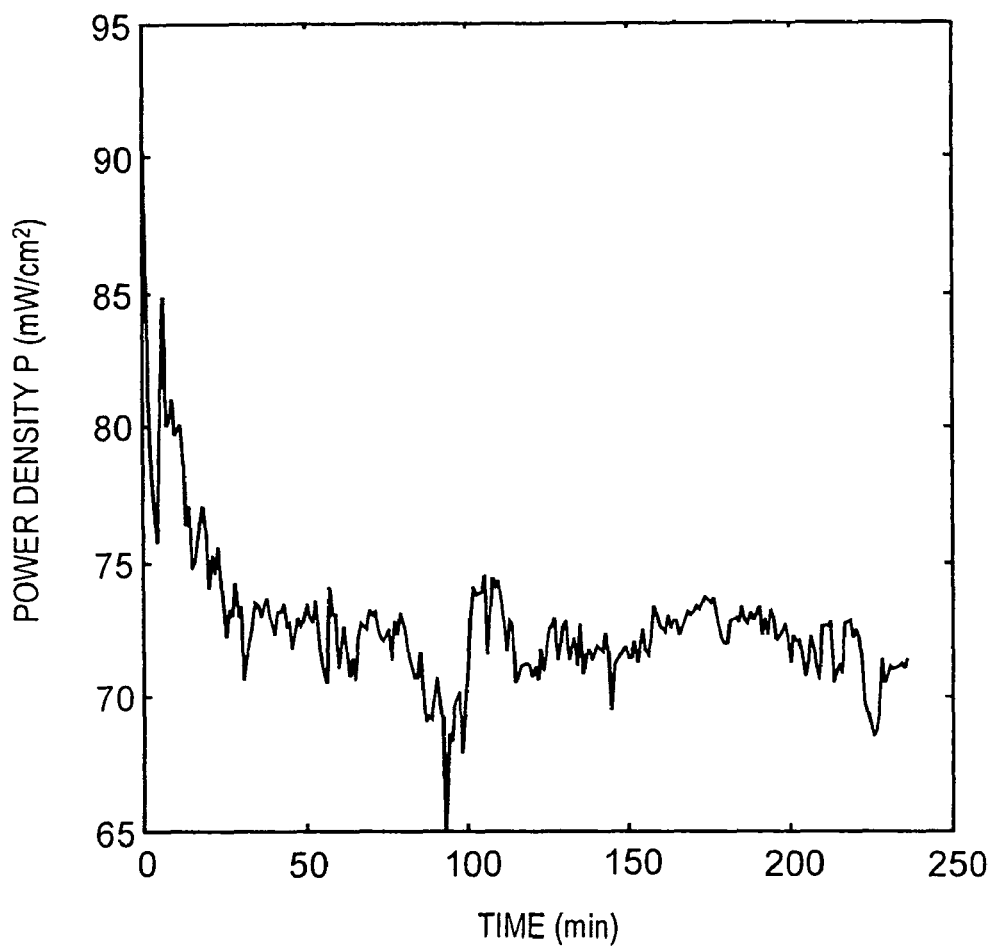
FIG. 8 shows the long term performance of the micro fuel cell operating at 0.50 V.

FIG. 8 shows the long term performance of the micro fuel cell operating at 0.50 V. The performance is stable during operation for at least 6 hours (as shown). The life span of the polymer fuel cell is expected to be in the order of "years" as long as hydrogen and air are continuously supplied to the anode and cathode of the fuel cell, respectively. The life span of a polymer fuel cell may be reduced, however, if it were to be fed with methanol (that would cause catalyst poisoning), or operated at elevated temperature (causing overheating and dehydration of membrane).

Figure 9:
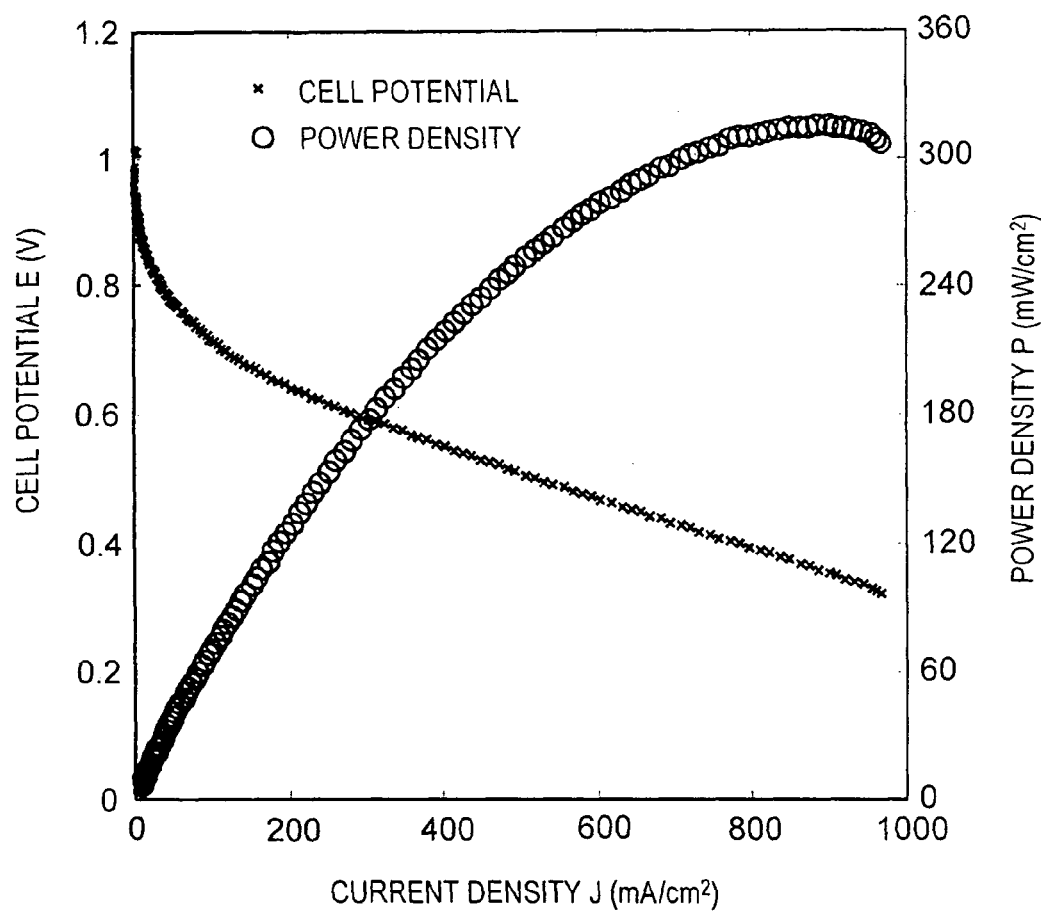
FIG. 9 shows the results of a hydrogen/oxygen cell reaction.

FIG. 9 shows the results of a hydrogen/oxygen cell reaction of the present invention. The power density reaches a peak at a current density of 901 mA cm$^{-2}$. The voltage and power density corresponding to this point are 0.35 V and 315 mW cm$^{-2}$, respectively. If the operation voltage is 0.50V, the power density becomes 254 mW cm$^{-2}$.

The micro fuel cell test as described above achieved superior performance compared with devices made using conventional techniques. This was due to design aspects of the base substrate and the electrodes described above. In the design of the base substrate, both water management and electrical interconnection are considered. The aspect of electrical interconnection is optimized by the fabrication technique employing a Gaussian-shaped channel cross-section. The spiral design of the channel improves water management. In the electrode design, the area is well divided to reach a satisfactory compromise between current collecting and gas diffusion.

In summary, the first aspect of the present invention provides a method for fabricating the micro fuel cell by polymeric micromachining. In the example fuel cell described, the membrane electrode assembly is sandwiched between two gold-coated PMMA base substrates. The gas flow channels are fabricated on the substrate by $CO_2$ laser micromachining that provides a flow channel having a Gaussian cross-section. The assembled fuel cell was tested by an electronic load system. At room temperature, the power output of the 3 cm$^2$ exemplified fuel cell can reach 0.947 W (315 mW cm$^{-2}$) when pure hydrogen is fed to the anode and pure oxygen is supplied to the cathode. When air is used on the cathode side, the power output can reach 0.246 W (82 mW cm$^{-2}$). During the testing, the hydrogen was set to be dead-ended, which means the utilization of hydrogen was substantially 100%.

Large Scale Production of Micro Fuel Cells

Next, with reference to FIGS. 10(a) to 10(f), is a description of steps in the production of an exemplary metal mold for creating polymeric parts with smoothly curved Gaussian-shaped channel walls on a large scale basis.

Figure 10A:
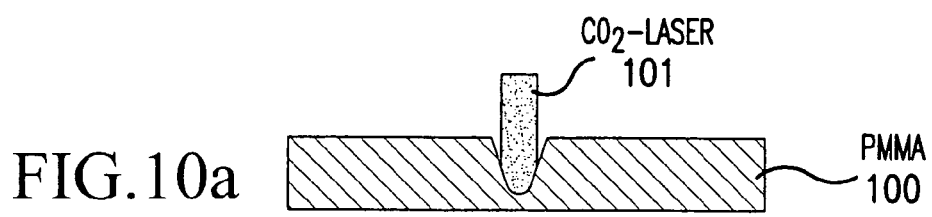
Figure 10B:
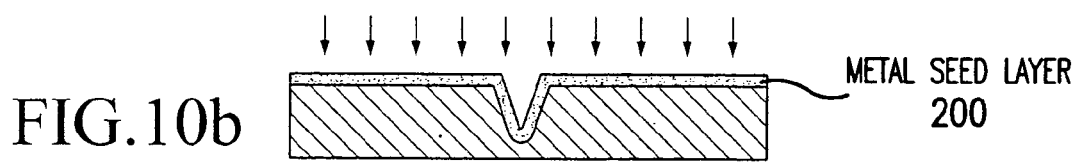
Figure 10C:
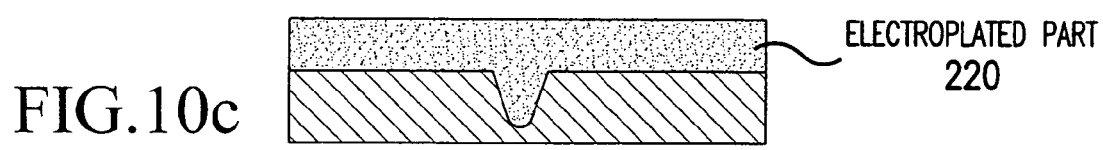
Figure 10D:
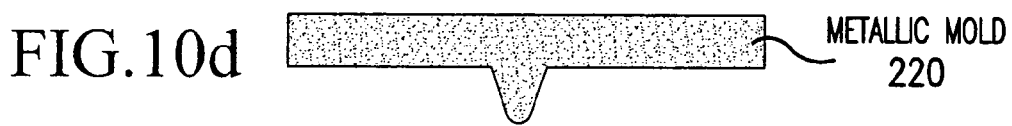
Figure 10E:
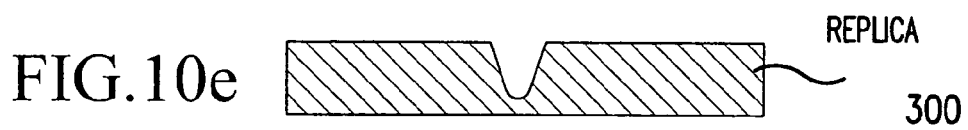
Figure 10F:
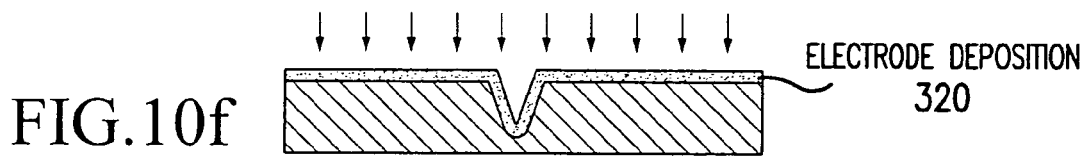

First a laser creates the smoothly walled Gaussian-shaped channel 101 on a PMMA substrate 100, as shown in FIG. 10(a). The shape of the channel 101 is determined by the following parameters: the substrate material (with relatively low thermal diffusivity), the laser intensity and the laser beam speed. A multiplicity of different shapes can be designed using different substrate materials, laser intensity and laser beam speed. PMMA has a suitable thermal diffusivity for making a Gaussian shape, and is explained in further detail below.

To be able to produce the desired Gaussian shape, thermal diffusivity of the substrate material should be low, or on the order of 0.1 mm$^2$/s. The desired Gaussian shape may also be achieved with substrates having thermal diffusivities in the range from 0.01 mm$^2$/s to 10 mm$^2$/s. As an example, the thermal diffusivity of PMMA is typically 0.122 mm$^2$/s. As mentioned above, the laser ablation process is determined by thermal energy. Materials with high thermal diffusivity such as copper (thermal diffusivity of 107 mm$^2$/s) dissipate the energy quickly and cannot be used to produce the Gaussian-shaped distribution of thermal energy in the substrate. When a material of low thermal diffusivity is used for the substrate, the cross section of the microchannel depends on the shape of the laser beam, its moving speed, the laser power and the thermal diffusivity of substrate material. The energy of the laser beam has a Gaussian distribution, thus the cross section of the channel also has a Gaussian shape. The channel depth is proportional to the laser power as well as the number of scanning passes. In addition to these two parameters, the beam speed also affects geometry of the cross-section. The channel widths and channel depths are inversely proportional to the beam speed.

A suitable laser power is: P<2.5 W. A suitable range for the beam speed is between 6.4 mm/s and 64 mm/s.

Figure 11A:
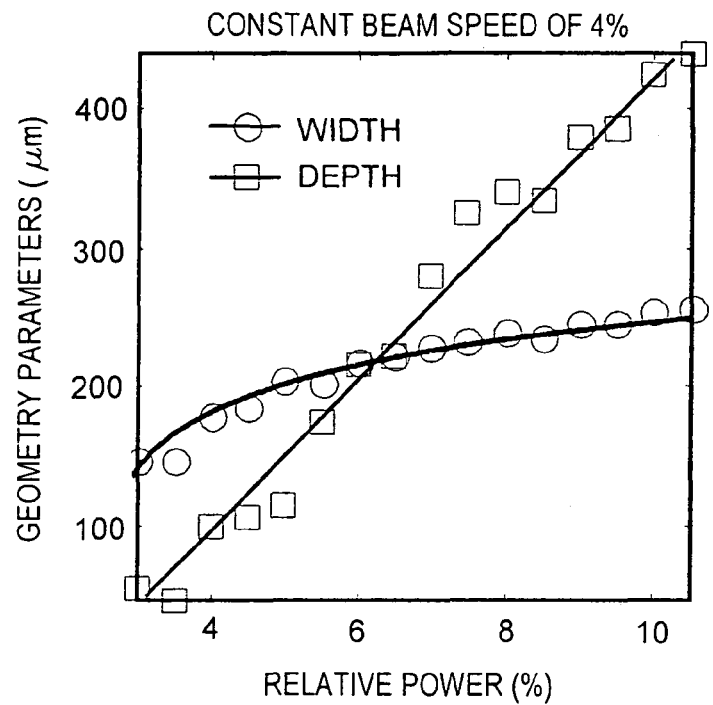
FIGS. 11(a) and (b) illustrate the influence of laser power and beam speed on the geometric parameters of a channel.
Figure 11B:
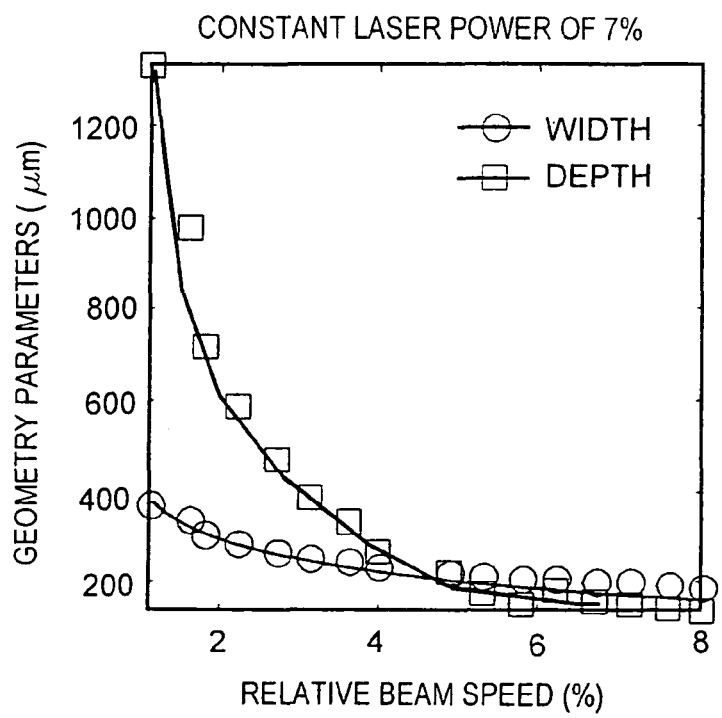

FIGS. 11(*a*) and (*b*) illustrate the influence of laser power and beam speed on geometric parameters of the channel. The relative values are based on a maximum laser power of 25 W and a maximum beam speed of 640 mm/s. The circles and squares in FIGS. 11(*a*) and (*b*) are measurement results, respectively, for the width and depth of the channel, and the lines are fitting curves.

Next as shown, in FIG. 10(*b*), a thin metal layer 200 is deposited on the substrate 100, the thin metal layer 200 working as the seed layer for a subsequent electroplating process. Either sputtering or evaporation can deposit the metal layer 200. Compared with the conventional techniques, such as that shown in FIGS. 1(*a*) and 1(*b*), the Gaussian shape used in the present invention allows electroplating to cover the surfaces of the channel (or gap) 101, without closing the top of the channel 101 (i.e., without filling the channel 101, as can be seen in FIG. 10 (*b*)). Thus, the present invention avoids the problem typically encountered with conventional high-aspect-ratio techniques, such as LIGA, as described above. The temperature for the deposition process of the seed layer 200 should be kept under the glass temperature of the polymer. In case of PMMA, the temperature should be kept below 106° C. Preferably, the deposition should be performed when the PMMA is at a temperature range of from −10° C. to 70° C.

For example, a 50-nm to 200-nm-thick Cr/Au layer may be used as the seed layer 200. The substrate coated with the seed layer 200 is then placed into a nickel electrolyte. Wetting agent (surfactant) can be added into the liquid to reduce the surface tension of the liquid. Plating current density is in the range of 50 A/m$^2$ to 500 A/m$^2$, preferably on the order of 100 A/m$^2$. The electrolyte solution is kept in a range 30° C. to 80° C., or preferably at 50° C., and is stirred mechanically.

Using the seed layer (FIG. 10(*b*)), a thick metal structure 220 can be electroplated on top of the polymeric part, as shown in FIG. 10(*c*). The metal structure 220 is typically much thicker then the seed layer. For example, the thickness of the metal structure may be in the range of a few mm (say 5 mm) up to 1 cm. The electroplated layer is subsequently used as a negative mold and must be of sufficient thickness to be robust when used in a process such as an injection molding or a hot embossing process. The metal structure 220 is then released from the polymeric mold. This can be done by dissolving the polymeric part in a strong solvent as shown in FIG. 10(*d*). In the case of PMMA, a boiling NaOH solution may be used.

The metal structure 220 works as a negative mold for the subsequent replication process (injection molding or hot embossing). A molded part 300, as shown in FIG. 10(*e*), can be made of any polymeric material or a metal powder or a carbon powder with a binding agent, for example. While a high thermal diffusivity is not important for hot embossing, a high diffusivity is nonetheless desirable in the replica to provide efficient dissipation of heat from the fuel cell during operation. In addition, laser-assisted engraving with other materials would not give a well-controlled and well-defined Gaussian shape.

The molded plastic part 300 can then be made conductive by sputtering or evaporating a thin metal layer 320 over its surface, as shown in FIG. 10(*f*). As mentioned above, the thickness of the thin metal layer is typically in the range of 40 nm to 200 nm). The smooth Gaussian-shaped curved topography of the molded plastic part allows uniform coating of the metal layer 320, and minimizes the internal electrical resistance of the electrodes of the fuel cell 1.

In summary, the second aspect of the present invention provides a method for creating a metallic mold to form polymeric micro fuel cells having smooth Gaussian-shaped curved channel walls. Further, the metallic mold makes possible large scale manufacturing of polymeric micro fuel cells, thereby reducing the manufacturing cost and time, increasing the flexibility for changing chip design, and satisfying the current and future technical requirements for manufacturing of polymeric fuel cells.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for pattern molding a channel on a plurality of substrates, comprising the steps of:
    creating a channel having a Gaussian-shaped cross section in a first substrate using a CO$_2$ laser;
    depositing a metallic seed layer over the first substrate using a first metal;
    electroplating a second metal layer over the seed layer to create a negative mold;
    releasing the negative mold from the first substrate; and
    fabricating a plurality of channels each having a Gaussian-shaped cross-section, in a plurality of second substrates, using the negative mold.

2. The method according to claim 1, wherein width of the Gaussian-shaped channel is determined by a laser beam size, and maximum depth of the channel is determined by a laser power.

3. The method according to claim 1, wherein the channel is carved in the first substrate using a laser with a beam speed between 6.4 mm/s and 64 mm/s.

4. The method according to claim 1, wherein the depositing step covers walls of the channel without closing a top of the channel.

5. The method according to claim 1, wherein the second metal layer is thicker than the seed metal layer.

6. The method according to claim 1, wherein the releasing step includes applying a solvent to the first substrate.

7. The method according to claim 6, wherein the first substrate is PMMA and the solvent is a solution of NaOH.

8. The method according to claim 1, wherein the first substrate is formed of polymethylmethacrylate (PMMA), and the second substrate is not limited to polymethylmethacrylate (PMMA).

9. The method according to claim 1, wherein the second substrate is a polymer and the fabricating step includes injection molding or hot-pressing the second substrate.

10. The method according to claim 1, wherein the first substrate has a thermal diffusivity in a range of 0.01 mm$^2$/s to 10.0 mm$^2$/s.

11. The method according to claim 1, wherein the second substrate is a carbon-containing material or metal, and the fabricating step includes a step of depositing a metal powder composition or a carbon-containing powder composition on the negative mold and sintering.

12. The method according to claim 1, wherein the Gaussian-shaped channel is a spiral-shaped channel.

13. The method according to claim 1, wherein the Gaussian-shaped channel has a depth of 100 to 1400 μm, and is carved in the first substrate using a laser with a beam speed of 6.4 to 64 mm/s and a laser power of 0.25 to 25 W.

14. The method according to claim 1, in which the seed layer is deposited by sputtering.

15. A method for pattern molding a channel on a substrate, comprising the steps of:
creating a Gaussian-shaped channel on a first substrate using a CO$_2$ laser;
electroplating a metal over the first substrate to create a negative mold;
releasing the negative mold from the first substrate; and
fabricating a plurality of second substrates, each having the Gaussian-shaped channel, using the negative mold.

16. The method according to claim 15, further comprising:
covering the first substrate with a first metal of Cr/Au having a thickness of 50 nm to 200 nm prior to the electroplating step.

17. The method according to claim 16, in which the negative mold is released from the first substrate with a solution of NaOH.

18. The method according to claim 17, wherein the fabricating step includes injection molding or hot-pressing the second substrate.

19. The method according to claim 16, wherein the second substrate is a metal powder composition or a composition of a carbon powder with a binding agent, and the fabricating step is performed by depositing said metal powder composition or said composition of a carbon powder on said negative mold and sintering.

20. A negative mold for pattern molding a channel on a polymeric substrate formed by the steps of:
creating a Gaussian-shaped channel on a polymethylmethacrylate (PMMA) substrate using a CO$_2$ laser;
sputtering a metallic seed layer over the polymethylmethacrylate (PMMA) substrate using a first metal;
electroplating a second metal over the seed layer to create a negative mold;
releasing the negative mold from the polymethylmethacrylate (PMMA) substrate,
wherein the negative mold has a projecting part which is a negative image of the Gaussian-shaped channel.

21. A polymeric fuel cell, comprising:
a first and a second polymeric substrate;
a membrane electrode assembly disposed between the first polymeric substrate and the second polymeric substrate;
an electrical contact located at a central portion of the substrate;
a gas inlet adjacent to a perimeter of the substrate;
a gas outlet adjacent to the electrical contact; and
channels formed on a surface of each substrate, the channels spiraling inwardly from a gas inlet and ending at the gas outlet,
wherein the channels has a Gaussian-shaped cross section, defined by a Gaussian curve that is described by the function: $y = H \exp[-x^2]/[(w/4)^2]$
where H=penetration depth of the channel, W=width of the channel, x is the position along the width of the channel, and y, as defined above is the penetration depth at point x.

22. The polymeric fuel cell according to claim 21, wherein the metallic layer covers walls of the channel without closing a top of the channel.

23. The polymeric fuel cell according to claim 21, wherein the membrane electrode assembly comprises carbon paper with a catalyst layer.

24. A method for making a conductive channel in a polymeric substrate, comprising:
creating a channel having a Gaussian-shaped cross section in the substrate using a laser; and
depositing a metallic seed layer over the substrate using a line-of-sight method in order to obtain a conductive channel in the substrate.

* * * * *